United States Patent [19]

Bolin

[11] 4,117,528
[45] Sep. 26, 1978

[54] GAS-INSULATED TRANSMISSION LINES WITH DC VOLTAGE LIMITING MEANS

[75] Inventor: Philip C. Bolin, Northboro, Mass.

[73] Assignee: Westinghouse Electric Corp., Pittsburgh, Pa.

[21] Appl. No.: 772,789

[22] Filed: Feb. 28, 1977

[51] Int. Cl.² .................. H02H 3/22; H02H 7/22
[52] U.S. Cl. ............................ 361/120; 200/148 B
[58] Field of Search .......... 361/120, 117, 118, 126, 361/129, 132, 233, 56; 200/148 B, 148 H; 313/244, 245, 246, 249, 250, 325, 231.1; 174/2

[56] References Cited

U.S. PATENT DOCUMENTS

| 3,123,734 | 3/1964 | Dunne | 361/120 X |
| 3,515,939 | 6/1970 | Trump | 361/233 |
| 3,624,450 | 11/1971 | Graybill | 361/120 |
| 3,679,939 | 7/1972 | Nitta et al. | 361/120 |
| 4,031,347 | 6/1977 | Isikawa et al. | 361/120 X |

FOREIGN PATENT DOCUMENTS 2,552,086  5/1977  Fed. Rep. of Germany .......... 361/120

Primary Examiner—Patrick R. Salce
Attorney, Agent, or Firm—M. S. Yatsko

[57] ABSTRACT

A gas-insulated transmission line including an outer sheath at low potential, an inner conductor within the outer sheath at high AC potential, an insulating gas disposed within the outer sheath for electrically insulating the inner conductor from the outer sheath, and means for insulatably supporting the inner conductor within the outer sheath. Means for limiting the DC voltage on the inner conductor are included, with these means being responsive to the DC voltage on the inner conductor so that the DC voltage limiting means discharge the DC voltage on the line whenever the DC voltage exceeds a predetermined level.

11 Claims, 4 Drawing Figures

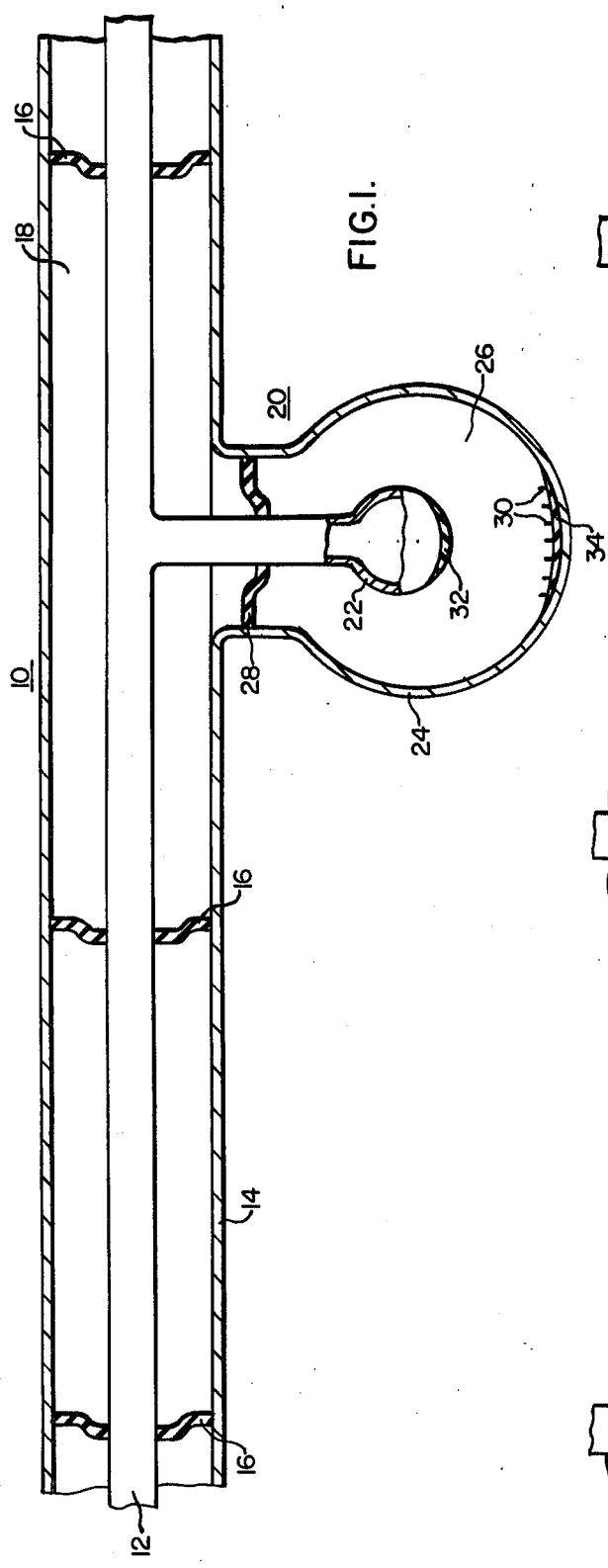
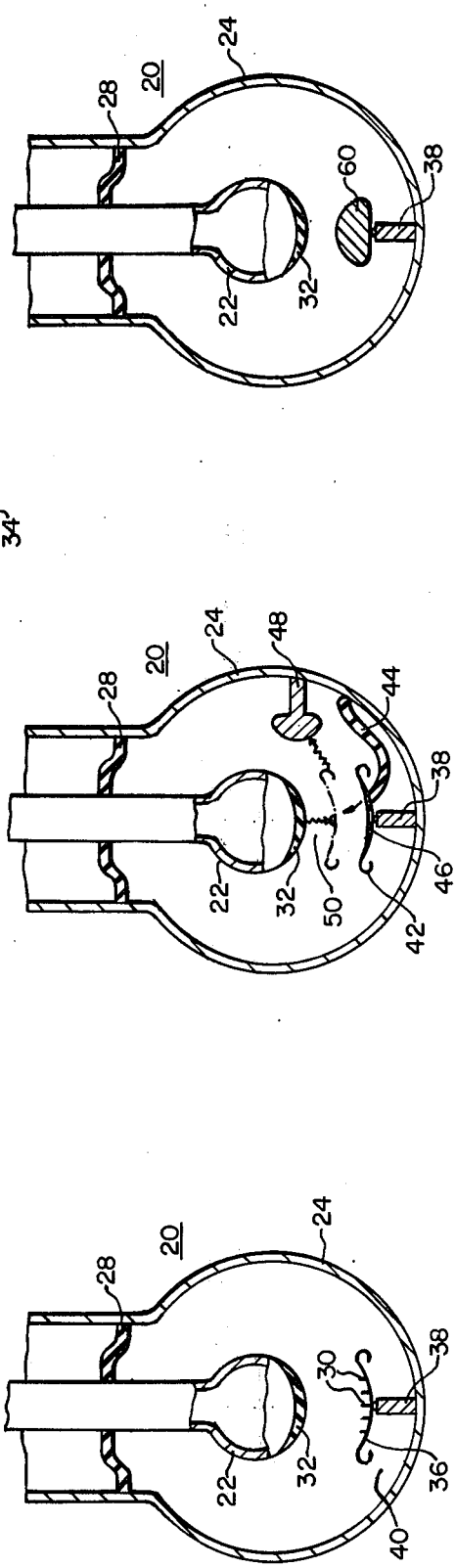

GAS-INSULATED TRANSMISSION LINES WITH DC VOLTAGE LIMITING MEANS

BACKGROUND OF THE INVENTION

This invention relates generally to gas-insulated transmission lines and more particularly to a gas-insulated transmission line utilizing means for limiting the DC voltage on the inner conductor on the line.

Compressed gas-insulated transmission lines are being used in an ever increasing scale in recent years due to the desirability of increasing safety, problems in acquiring right-of-way for overhead lines, and higher power loads required by growing metropolitan areas and growing demands for electrical energy. Gas-insulated transmission lines typically comprise a hollow sheath, a conductor disposed within the sheath, a plurality of solid insulating spacers which support the conductor, and a compressed gas such as sulfur hexafluoride or the like in the sheath to electrically insulate the conductor from the sheath. The typical assembly has been fabricated from relatively short sections of hollow cylindrical ducts or tubes in which the conductor and insulators are inserted. This assembly is usually completed in the factory, and the sections are welded or otherwise secured together in the field to form the transmission line. Gas barriers are provided at intervals along the length of the assembly, and, after evacuation on the line, an insulating gas is forced into the the sheath under pressure. It is also known to provide a particle trap in compressed gas insulated transmission lines as is disclosed in the patent to Trump, U.S. Pat. No. 3,515,939.

The majority of the gas-insulated transmission lines installed to date have been utilized for the transport of alternating current, or AC, voltages. As such, they have been designed to withstand these AC voltages. However, under certain circumstances there is the possibility that DC voltages may be present on the inner conductor. For example, if breakers or switches are opened at either end of an unloaded line, such opening of the line will cause a DC voltage to become trapped on the line. As the transmission line has not been designed for DC voltages, there is an increased probability that the line will sustain serious damage due to the effects of the DC trapped charge.

SUMMARY OF THE INVENTION

In accordance with this invention, it has been found that a more desirable gas-insulated transmission line is provided which comprises an elongated outer sheath at low potential, an elongated inner conductor disposed within the outer sheath at high AC potential with respect to the outer sheath, and an insulating gas disposed within the outer sheath which electrically insulates the inner conductor from the outer sheath. Means are disposed within the outer sheath for insulatably supporting the inner conductor within the outer sheath, and means are included for limiting the DC voltage on the inner conductor.

BRIEF DESCRIPTION OF THE DRAWINGS

Reference is now made to the description of the preferred embodiment, illustrated in the accompanying drawings, in which:

FIG. 1 is a sectional view of a gas-insulated transmission line according to the teachings of this invention;

FIG. 2 illustrates a modification of the DC voltage limiting means illustrated in FIG. 1;

FIG. 3 is a modification of the DC voltage limiting means illustrated in FIG. 1; and FIG. 4 is a modification of the DC voltage limiting means of FIG. 1.

BRIEF DESCRIPTION OF THE PREFERRED EMBODIMENT

A typical gas-insulated transmission line 10 is illustrated in FIG. 1. The transmission line 10 is comprised of an elongated inner conductor 12 disposed within an elongated outer sheath 14. Typically, both the inner conductor 12 and the outer sheath 14 are of a good conducting material such as aluminum. The inner conductor 12 is at a high AC potential with respect to the potential of the outer sheath 14, which generally is at ground potential. Disposed within the outer sheath 14, and insulatably supporting the inner conductor 12 within the outer sheath 14, are a plurality of insulating spacers 16. Electrically insulating the inner conductor 12 from the outer sheath 14 is an insulating gas 18 typical of which is sulfur hexafluoride. Although not shown, particle traps are typically disposed along the interior of the outer sheath 14 at spaced intervals to trap and deactivate any conducting or semiconducting particles which may be present within the outer sheath 14 and in the insulating gas 18. These particles are generally considered to have deleterious effects on the integrity of the transmission line 10, but the characteristics concerning the movement of these particles have been incorporated within the DC voltage limiting means 20 which functions to limit the amount of DC voltage, or DC trapped charge, which may be present on the inner conductor 12. For these reasons, it may be informative to discuss the characteristics of this conducting particle movement.

Detailed descriptions of the characteristics of particle movement have been made in the aforementioned patent to Trump, U.S. Pat. No. 3,515,939, in the paper presented at the 1976 session of the International Conference on Large High Voltage Electric Systems entitled "Recent Research In The United States On The Effect Of Particle Contamination Reducing The Breakdown Voltage In Compressed Gas-Insulated Systems", Paper No. 15-09, by P. C. Bolin et al, and in the paper presented at the IEEE Power Engineering Society Summer Meeting, July, 1976 entitled "Influence Of Particles On AC and DC Electrical Performance Of Gas-Insulated Systems At Extra-High Voltage", Paper No. F76 323-6, by C. M. Cooke et al. Suffice it to say that the characteristics of particle movement vary dependent on whether the applied voltage is direct current or alternating current. A brief description of these differences may be undertaken with reference to the gas-insulated transmission line illustrated in FIG. 1.

Assume that the inner conductor 12 is charged to a high DC potential, and the outer sheath 14 is at ground potential. If a particle is present at the bottom interior of the outer sheath 14, it acquires a charge which is a function of the local electric field caused by the DC voltage on the inner conductor 12, and the shape, orientation, and size of the particle. The force on the particle is the product of the charge and the electric field, and when this force exceeds the gravitational force the particle is elevated. This force causes the particle to move toward the inner conductor 12 from the outer sheath 14. After the particle crosses the gap to the inner conductor 12, it will contact the inner conductor 12, change polarity, and then traverse back across the gap of the insulating gas 18 to the outer sheath 14. Since the voltage applied to the inner conductor 12 is direct current, the field remains constant and the particle will continue traveling in the same direction until it hits either the inner conductor 12 or the outer sheath 14 which will then cause it to reverse itself. However, the particle behaves in a dissimilar manner when the inner conductor 12 has an AC potential.

If the inner conductor 12 has an AC voltage upon it, the particle, as before, will acquire a charge as it is resting adjacent the outer sheath 14. This charge, together with the electric field, produces a force which tends to elevate the particle when the force exceeds the gravitational force. Before the particle can cross the gap to contact the inner conductor 12, however, the field will decrease to zero and then actually reverse direction due to the reversed polarity of the AC voltage. Since the particle may be out of contact with either the inner conductor 12 or the outer sheath 14, it cannot easily change its charge state so that it will then be forced back to the outer sheath 14 from which it started. The matter of fact is that for AC voltages of certain frequencies, the particles will "dance" or "bounce" on the outer sheath 14 thereon long before the particles will gain enough force to cross the gap. This has been observed in the 50–60 Hz and higher range. Thus, it can be appreciated that, for a given potential, particles acting under the influence of a DC field will move more actively and for greater distances than will similarly disposed particles acting under the influence of an AC field. The realization of this difference in movement has been incorporated into the DC voltage limiting means 20 incorporated within the transmission line 10.

The DC voltage limiting means 20 comprises a first electrode 22 which is electrically connected to the inner conductor 12 and extends radially outwardly therefrom, and a second electrode 24 which is electrically connected by bolts or by welding, for example, to the outer sheath 14. The second electrode 24 extends radially outwardly from the outer sheath 14, and encloses therein the first electrode 22 in a spaced-apart relationship. An insulating gas 26, which may be sulfur hexafluoride as is the insulating gas 18, electrically insulates the first electrode 22 from the second electrode 24. An insulating spacer 28 supports the first electrode 22 within the second electrode 24, and preferably the spacer 28 provides a gas-tight barrier to prevent the insulating gas 26 from mixing with the insulating gas 18 within the transmission line proper 10. This separation of the two insulating gases 18, 26 is to prevent any contamination of the insulating gas 26 caused by the discharge of the first electrode 22 from contaminating the insulating gas 18 in the remainder of the transmission line 10. Both the first electrode 22 and the second electrode 24 are spherically shaped at end portions thereof.

A plurality of conducting particles 30 are disposed in the lowermost portion of the second electrode 24. These particles will remain on the second electrode 24 due to the forces of gravity, and will not traverse across the gap to the first electrode 22 under the field effect of the alternating current which is normally on the first electrode 22 and the inner conductor 12. However, upon the occurrence of a DC charge on the inner conductor 12, the first electrode 22 will also have a DC voltage impressed thereon, and this DC voltage on the first electrode 22 will cause the conducting particles 30 to traverse the gap from the second electrode 24 to the first electrode 22. After these particles 30 electrically contact the first electrode 22, they will precipitate a spark at the first electrode 22 which causes the DC voltage on the first electrode 22 and the inner conductor 12 to discharge. To prevent erosion of the first electrode 22 and the second electrode 24, it is preferable that the lowermost portions of the first and second electrodes 22, 24 respectively have secured thereto an arc resistant material 32, 34. By so placing the arc resistant material 32, 34, the sparking and discharge of the first electrode 22, and any arcs which may occur, will not cause an erosion of the two electrodes 22, 24.

The distance between the first electrode 22 and the second electrode 24 is designed so that the normal operating voltages and frequency of the inner connector 12 will not cause the particles 30 disposed adjacent the second electrode 24 to traverse the gap and contact the first electrode 22, but upon the occurrence of a DC voltage on the first electrode 22 of a predetermined level, the particles will traverse the gap, contact the first electrode 22 and cause discharge thereof. Thus, the gap distance through which the particles must traverse is designed to be a function of the quantity of DC voltage upon the inner conductor 12 to which it is desired to be limited.

A modification of the DC voltage limiting means 20 is illustrated in FIG. 2. In this modification, the first electrode 22, the second electrode 24, the spacer means 28, and the particles 30 are as heretofore described. However, in this modification, the particles 30 do not rest on the second electrode 24, but instead are disposed upon a third electrode 36. This third electrode 36 is supported by, and electrically connected to the second electrode 24, by either a resistive or an inductive element 38. By so isolating the third electrode 36 from the second electrode 24, the third electrode 36 only charges to a fraction of what it would go to in potential as compared to the charge it would obtain if it were solidly grounded for AC voltages. This lowering of the charge inhibits the activity of particles 30 under alternating current of 50–60 Hz and higher frequency, but allows DC potentials to effectively ground the electrode 36 for maximum particle charging and movement upon the occurrence of a DC voltage on the first electrode 22. In the preferred embodiment, the gap 40 between the third electrode 36 and the second electrode 24 is set to insulate the third electrode 36 in a floating potential to about one-half the operating voltage of the inner conductor 12 and the first electrode 22.

A further modification of the DC voltage limiting means 20 is illustrated in FIG. 3. As before, the first electrode 22, the second electrode 24, and insulating suport 28, are as previously described. In this modification, though, the DC voltage discharging means comprises a conducting member 42 which is disposed intermediate said first electrode 22 and said second electrode 24, and an insulating support 44 which is fixedly secured to the conducting member 22, and is pivotally connected to the second electrode 24. The conducting member 42, to prevent erosion upon the occurrence of current limiting activity, has secured thereto an arc-resistant material 46 at locations where the first electrode 22 and the conducting member 42 electrically contact each other. To facilitate the discharge of the DC voltages impressed on the first electrode 22 to the grounded second electrode 24, an arcing electrode 48 is disposed within the second electrode 24 and is electrically connected thereto.

The operation of the discharging means in this modification occurs as follows. If there is no DC potential impressed upon the inner conductor 12, and the first electrode 22, the conducting member 42 will contact the second electrode 24, or if incorporated within the discharging means, the resistor or inductive element 38, because the field induced by the alternating current voltage on the first electrode 22 will be insufficient to cause the conducting member 42 to traverse the gap 50. However, upon the occurrence of a DC voltage on the first electrode 22, the resulting field will lift the conducting member 42 and cause it to pivot about the insulating support 44 until such time as the conducting member 42 comes into electrical contact with the first electrode 22. In this instance, electrical contact not only means physical contact between the conducting member 42 and the electrode 22, but also includes those instances wherein the conducting member 42 is so close to the first electrode 22 that an arc will travel therebetween. In both of these instances, the electrical contact of the conducting member 42 with the first electrode 22 causes the discharge of the DC voltage which is present on the first electrode 22. The arc will discharge from the conducting member 42 to the arcing electrode 48, which is disposed adajcent to the conducting member 42 when said conducting member 42 is in electrical contact with the first electrode 22. Therefore, the arc and discharge of the DC voltage will occur more readily, and with less deterioration of the insulating gas 26.

Another variation of the DC voltage limiting means 20 is illustrated in FIG. 4. In this modification, the DC voltage limiting means 20 comprises the first electrode 22, second electrode 24, a third electrode 60, and a resistive or inductive support 38. The third electrode 60, because of its electrical connection to the second electrode 24 through the support 38, varies in potential for AC but is effectively grounded for DC. The third electrode 60 is spaced-apart from the first electrode 22 a distance such that, upon the occurrence of the predetermined DC voltage level, the distortion of the electric field caused by the third electrode 60 will precipitate a breakdown between the first electrode 22 and the third electrode 60. In this manner, the DC voltage is discharged only when it exceeds the predetermined level, and for lesser DC voltages or for AC voltages the discharging means are inoperative. Another advantage of this modification is that there is no movement of the various elements required.

Thus, it can be seen that this invention provides a means for limiting the amount of DC voltage which may be present on a gas-insulated transmission line, and which is inoperative in the presence of AC voltages alone.

I claim as my invention:

1. A gas-insulated transmission line comprising:
   an elongated outer sheath at low potential;
   an elongated inner conductor disposed within said outer sheath at high AC potential with respect to said outer sheath;
   an insulting gas disposed within said outer sheath and electrically insulating said inner conductor from said outer sheath;
   means for insulatably supporting said inner conductor within said outer sheath;
   a first electrode electrically connected to said inner conductor and extending radially outwardly therefrom;
   a second electrode electrically connected to said outer sheath and extending radially outwardly therefrom, said first electrode being spaced-apart from, and enclosed within, said second electrode, said first and second electrodes being vertically disposed with said second electrode extending below said first electrode; and
   means, responsive to DC voltage on said first electrode, for discharging said DC voltage on said first electrode whenever said DC voltage exceeds a predetermined level,
   said DC voltage discharging means being spaced-apart from said first electrode whenever said DC voltage is less than said predetermined level and in electrical contact with said first electrode whenever said DC voltage exceeds said predetermined level, said high AC potential being inoperative to move said DC voltage discharing means into electrical contact with said first electrode, said DC voltage discharging means comprising a conducting particle intentionally disposed within said second electrode at the lowermost portion thereof, said particle traversing from said second electrode to said first electrode only when said DC voltage exceeds said predetermined level, said particle upon contacting said first electrode discharging said DC voltage.

2. The gas-insulated transmission line according to claim 1 wherein said first and second electrodes, at their respective lowermost portions, having an arc-resistant material secured thereto.

3. The gas-insulated transmission line according to claim 1 wherein said DC voltage discharging means includes a third electrode disposed intermediate said first and second electrodes at their respective lowermost portions, and a resistive element supporting said third electrode and electrically connecting said second and third electrodes, said conducting particle being intentionally disposed on said third electrode and traversing from said third electrode to said first electrode only when said DC voltage exceeds said predetermined level.

4. The gas-insulated transmission line according to claim 1 wherein said DC voltage discharging means includes a third electrode disposed intermediate said first and second electrodes at their respective lowermost portions, and an inductive element supporting said third electrode and electrically connecting said second and third electrodes, said conductive particle being intentionally disposed on said third electrode and traversing from said third electrode to said first electrode only when said DC voltage exceeds said predetermined level.

5. The gas-insulated transmission line according to claim 1 wherein said first and second electrodes are spherically shaped at end portions thereof.

6. The gas-insulated transmission line according to claim 1 wherein said outer sheath and said second electrode are at ground potential.

7. A gas-insulated transmission line comprising:
   an elongated outer sheath at low potential;
   an elongated inner conductor disposed within said outer sheath at high AC potential with respect to each outer sheath;
   an insulating gas disposed within said outer sheath and electrically insulating said inner conductor from said outer sheath;

means for insulatably supporting said inner conductor within said outer sheath;

a first electrode electrically connected to said inner conductor and extending radially outwardly therefrom;

a second electrode electrically connected to said outer sheath and extending radially outwardly therefrom, said first electrode being spaced apart from, and enclosed within, said second electrode, said first and second electrodes being vertically disposed with said second electrode extending below said first electrode; and means, responsive to DC voltage on said first electrode, for discharging said DC voltage on said first electrode whenever said DC voltage exceeds a predetermined level, said DC voltage discharging means being spaced-apart from said first electrode whenever said DC voltage is less than said predetermined level and in electrical contact with said first electrode whenever said DC voltage exceeds said predetermined level, said high AC potential being inoperative to move said DC voltage discharging means into electrical contact with said first electrode, said DC voltage discharging means comprising a conducting member disposed intermediate said first and second electrode, and an insulating support fixedly secured to said conducting member and pivotally connected to said second electrode, said conducting member being positioned such that, upon the occurrence of a DC voltage greater than said predetermined level, said conducting member will be in electrical contact with said first electrode to discharge said DC voltage.

8. The gas-insulated transmission line according to claim 7 wherein said DC voltage discharging means includes a resistive element electrically connected to said second electrode, said resistive element electrically contacting said conducting member whenever said DC voltage is inoperative to move said conducting member.

9. The gas-insulated transmission line according to claim 7 wherein said DC voltage discharging means includes an inductive element electrically connected to said second electrode, said inductive element electrically contacting said conducting member whenever said DC voltage is inoperative to move said conducting member.

10. The gas-insulated transmission line according to claim 7 wherein said first electrode and said conducting member have secured thereto an arc-resistant material at locations where they electrically contact each other.

11. The gas-insulated transmission line according to claim 7 including an arcing electrode, secured to said second electrode and disposed adjacent said conducting member when said conducting member is in electrical contact with said first electrode.

* * * * *